United States Patent [19]

Fields

[11] 4,335,739
[45] Jun. 22, 1982

[54] SLIDER VALVES

[76] Inventor: Robert E. Fields, 51 Norfolk St., Cambridge, England

[21] Appl. No.: 116,111

[22] Filed: Jan. 28, 1980

[30] Foreign Application Priority Data

Jan. 29, 1979 [GB] United Kingdom ............... 7903090

[51] Int. Cl.³ .................... F16K 11/06; F16K 1/42
[52] U.S. Cl. ................... 137/269; 137/625.48; 251/367
[58] Field of Search ................... 137/625.48, 269; 251/367

[56] References Cited

U.S. PATENT DOCUMENTS

| | | | |
|---|---|---|---|
| 2,858,851 | 11/1958 | Holl | 137/625.48 X |
| 3,202,170 | 8/1965 | Holbrook | 137/269 |
| 3,516,442 | 6/1970 | Munroe | 137/269 X |
| 3,828,821 | 8/1974 | Dotter | 137/625.48 X |

FOREIGN PATENT DOCUMENTS 949202 9/1956 Fed. Rep. of Germany ........................ 137/625.48

Primary Examiner—Arnold Rosenthal
Attorney, Agent, or Firm—Allison C. Collard; Thomas M. Galgano

[57] ABSTRACT

This invention concerns a slider valve in which a sliding block (10) of generally square cross-section (the corners of which are rounded) is a close sliding fit in a circular bore (14) in a body member (16). At right angles to the axis of the bore (14) and communicating therewith are ports (18) each of which is similar. Each port includes a smaller diameter section in which is located a cylindrical pad (22) of a plastics material having a fluid passage (24) formed therethrough to allow fluid from a tube (26) encased within a metal sheath (28) to pass into a port (30 or 32) in the block (10) if the latter is registering therewith. Two or more such valves can be joined by axially aligning and securing together the cylindrical body member 16 and the end of one block (10) will act on the end of an adjoining block (10) in an adjoining valve.

The movement of the block or blocks axially relative to the body member (16) is effected by means of an actuator (52, 54) at one end of the body member (16) and a similar actuator or spring is provided at the opposite end to return the block (10) to its original position.

The two extreme positions allow the bores (30, 32) in the block (10) to be aligned with selected ones of the ports (18).

Pre-alignment and setting up of each valve or of a plurality of valves arranged in series, can be easily effected by adjusting the relative positions of the bodies (16) and locking the adjusted positions. (FIGS. 1 and 2).

8 Claims, 4 Drawing Figures

SLIDER VALVES

DESCRIPTION

1. Field of Invention

This invention concerns slider valves. The invention allows slider valves to be constructed from plastics materials and to withstand considerably higher pressures than has hitherto been the case without breakdown and leakage.

2. Background to the Invention

Slider valves are so-called because they essentially comprise a housing within which a drilled block is slidable so as to allow the drillings in the block to align with different fluid inlets and outlets thereby effecting alternative switching of the fluid inlets and outlets. No rotation is required to adjust the position of the drillings and alter the fluid path or paths through the valve and to this end automatic operation of such valve can be executed more simply for example by means of a pneumatic ram operating on one end of the sliding block and a return spring operating on the other end of the block.

Problems have arisen in practice with such valves.

A first problem is common to all such valves and results from the ingress of dust and dirt from the atmosphere so that an abrasive lining is formed between the sliding surfaces of the block and bounding housing thereby shortening the life of the valve.

A second problem is associated with slider valves in which the seal between the sliding block and a fluid passageway formed in the bounding housing is effected by means of a pressure pad of resiliently deformable material typically plastics material which is forced into contact with the surface of the sliding block to maintain a fluid-tight seal therewith. The pressure required to maintain such a seal is found in practice to be sufficient to cause distortion of the block causing it to contract in size in the direction of applied thrust and to expand in other directions. This material flow is particularly noticeable in certain materials such as ethylenetetrafluoroethylene polymers which are preferred sliding block materials for fluid connectors and valves of this type due to their relative chemical inertness.

A third problem manifests itself when the fluid seal between the sliding block and the abutting faces of the sealing pads forced thereagainst is subjected to relatively high pressures. In practice it is found that the simple surface seal between the two members is not reliable and that leakage of fluid from the interface of the sealing pad and the sliding block results.

Whilst in some applications this is of no great importance, in the majority of chemical and medical experiments such loss of fluid produces contamination and loss of analytical accuracy, and consequently hitherto the use of such valves has had to be restricted to relatively low pressure systems.

Whilst this third problem can apparently be overcome by increasing the pressure exerted by the pressure pad against the surface of the sliding block either to stop leaks or to achieve the pressure rating required of the valve, it is found in practice that where PTFE is used, the pad distorts with time and with material flow, the shape of the pad changes so as to reduce the effective force transmitted through the pad thereby reducing the pressure exerted by the pad on the sliding block. This results in leakage once again so that this particular solution in known forms of construction does not represent a permanent solution.

A further problem with slider valves concerns the difficulty in adjusting the linear position of the sliding block within the bounding housing to align the drilings in the block with the fluid inlets and outlets in the housing after the valve has been assembled. Hitherto the alignment of the drillings and fluid inlets and outlets has depended upon manufacturing tolerances being carefully maintained. With PTFE and other plastics materials it is difficult and expensive to maintain such tolerances to a very high standard and whilst they can be maintained sufficiently accurately to admit simple one-stage slider valves to be constructed, the stacking of two or more slider valves so that the movement of one sliding valve is transmitted to the next etc. has resulted in problems in alignment of the drilings in the various sliding blocks with the fluid inlets and outlets.

OBJECTS OF THE INVENTION

It is an object of the invention to provide an improved form of slider valve in which these various defects and problems associated with previous designs of slider valves are obviated.

It is a related object of the invention to provide an improved form of construction of a slider valve which will readily allow a number of such slider valves to be stacked in series so that movement of one sliding block is transmitted to the next and so on, causing all the sliding blocks to move in unison, without the alignment problems associated with previous designs of sliding valves.

THE INVENTION

According to the broadest aspect of the present invention a slider valve comprises a body, a bore of generally circular cross-section through the body, a block slidable in the bore, the cross-section of the block being generally square but with the corners rounded so as to conform to the radius of the bore and allow the block to just fit within the bore, at least one pair of diametrically opposed ports formed in the body so as to extend perpendicularly to the axis of the bore and to communicate between the latter and pipe connections in the body, pads of resiliently deformable plastics material slidable in the ports and having flat inner end faces adapted to abut and sealingly engage the flat side faces of the block, each pad having a fluid passage therethrough which upon appropriate axial movement of the block within the body can be aligned with a fluid passage through the block extending between two flat side faces thereof and means for exerting thrust on the outer end faces of the pads to effect the sealing engagement with the block faces, the size of the cross-section of the pads being such that substantially the whole of the external surface of the block is supported by a bounding surface formed either by the inner wall of the bore or the inner end faces of the pads, thereby to reduce the possibility of distortion and material flow when the thrust on the pads acting on opposite side faces of the block is increased to accommodate high fluid pressures and maintain the sealing engagement between the abutting faces of the pads and the block.

By surrounding the block on all sides by the bounding surface, deformation of the block which has hitherto occurred when valves of this type have been used in high pressure installations (requiring high levels of thrust to be exerted through the pads on the block) is virtually inhibited and it has been found that the thrust on the pads acting on opposite side faces of the block can be increased very considerably so as to accommodate considerably higher pressures than has hitherto been the case.

Preferably the pads are formed from PTFE.

According to a preferred feature of the invention, one end of the body is adapted to be secured to an actuator for effecting axial movement of the sliding block within the body between at least two positions.

Typically the actuator comprises a pneumatic piston and cylinder arrangement with the piston having a central thrust pad adapted to abut one end of the sliding block within the body. Return movement can be effected by providing a compression spring acting on the opposite end of the block or by means of a second actuator and the opposite end of the body may therefore be adapted to receive the spring or the second actuator as required.

According to a preferred feature of the invention the body is generally cylindrical with the bore containing the slidable block coaxial with the external shape of the body and the ends of the body are formed with external screw-thread profiles onto which end caps or connecting sleeves having appropriately formed internal screw-thread profiles can be fitted.

A preferred form of pneumatic actuator therefore comprises a cylindrical member one end of which is open and the other end of which is generally closed, the open end having an internal screw-thread profile and adapted to be screwed onto the external screw-thread profile at one end of the body and within the cylindrical member a piston displaceable therein upon air or other operating fluid under pressure being introduced into the space between the closed end of the cylindrical housing and the opposed end face of the piston.

According to another preferred feature of the invention, initial setting up and alignment adjustment can be most simply effected by rotating the housing containing the piston relative to the body so as to adjust the position of the thrust face of the piston relative to the body. Since the thrust face of the piston acts on the end face of the block slidable in the bore in the body, this has the effect of moving the block relative to the bore or conversely providing an end stop for the end face of the block.

After initial setting up or alignment adjustment has been effected, the cylindrical housing containing the piston can be locked or otherwise secured in position relative to the body so as to hold the initial or adjusted position. This securing may be effected by means of an adhesive or by means of a grub screw or a locking nut or any other convenient means.

According to another preferred feature, the external screw-thread profile formed at the end of each cylindrical valve body allows two or more such valve bodies to be joined in axial alignment by means of appropriately internally screw-threaded connecting sleeves into which opposed ends of the two bodies to be joined are screwed.

Axial alignment of the two bodies produces axial alignment of the bores and corresponding alignment of the slidable blocks within the bores so that axial movement of one block will produce corresponding axial movement of an adjoining block.

In order to ensure that the fluid passage or passages through the two blocks are aligned with the fluid passages through the bounding pads of the blocks, axial adjustment of one body relative to the next can be effected after the valves have been initially joined together by rotating one body relative to the other within the joining sleeve until the exact position of alignment is obtained. The final position is then held by locking the bodies relative to the joining sleeve either by means of an adhesive or by grub screws or other locking means.

Where the blocks do not extend sufficiently in an axial direction, thrust members in the form of spacers or washers can be located between the opposed end faces of the blocks to take up any lost motion which would otherwise result.

It will be seen therefore that a valve embodying the preferred features of the invention can be fitted axially to any number of other similar valves so that the total assembly is operable in series from one end or the other or both to effect simultaneous movement of the sliding blocks within the individual valves.

According to a further preferred feature of the invention, the means for exerting thrust on the pads constitutes part of the means for connecting fluid conducting pipes to the pipe connections in the body. To this end the pipe connections conveniently comprise internally threaded ports of larger diameter than the ports containing the pads but co-axial therewith and the end of the pipe is formed with an annular shoulder and spring means is located between the rear of the shoulder and an externally threaded annular member screwed into the larger diameter port so as to compress the spring means against the rear face of the shoulder, the forward end of the shoulder acting on the rear face of the pad so as to transmit the thrust applied by the spring means through the shoulder to the pad.

Preferably the annular shoulder enlargement of the pipe end and connection thereto within the pipe fitting is of the type described in our co-pending Patent Application entitled "Improvements in and relating to pipe connections".

The invention will now be described by way of example with reference to the accompanying drawings.

IN THE DRAWINGS

FIG. 1 is a cross-section through a slider valve constructed as an embodiment of the invention, FIG. 2 is a cross-section of the embodiment shown in FIG. 1 on the line II—II and additionally shows an actuator adapted to be fitted to one end of the valve body, FIG. 3 is a similar cross-section to that of FIG. 2 of another embodiment of the invention containing four pairs of diametrically opposed fluid connections but with the actuator and sliding block removed, and FIG. 4 is a cross-section to an enlarged scale through a preferred form of pipe connection which serves to sealingly secure a fluid conveying pipe to a fluid connection in the body of a valve such as shown in FIGS. 1 to 3 and simultaneously exert thrust on the rear face of a pad sealingly engaging the opposed flat side of the sliding block within the valve.

DETAILED DESCRIPTION OF THE DRAWINGS

Figure 1:
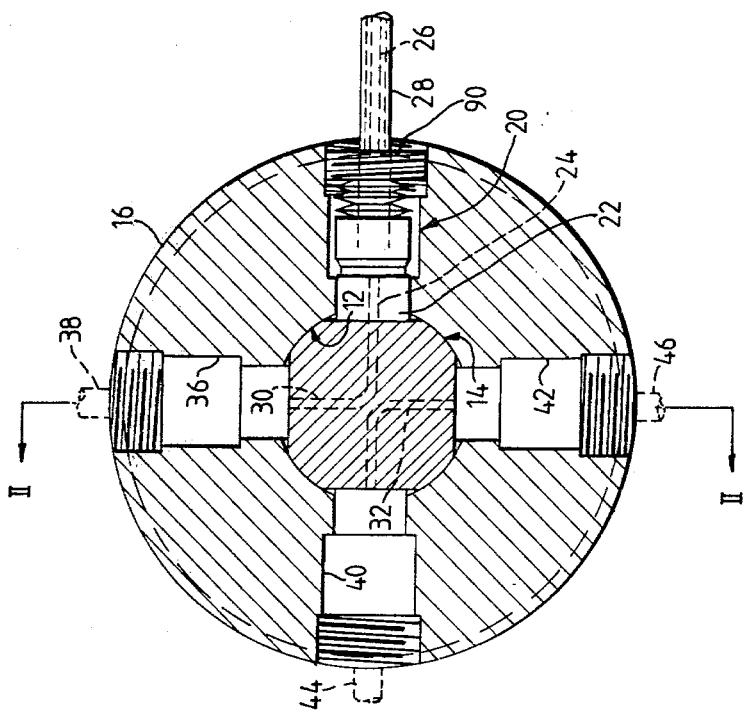

FIG. 1 illustrates by way of a cross-sectional view the main constructional feature of a slider valve embodying the invention. This feature lies in the provision of a block 10 of generally square cross-section the corners of which are rounded as at 12 so that the block is a close sliding fit in a circular bore generally designated 14 in a cylindrical body member 16.

At right angles to the axis of the bore 14 and communicating therewith are four ports one of which is denoted by reference numeral 18 and each of which communicates with a larger diameter section of the port denoted by reference numeral 20 in the case of the port 18 part of which is formed internally with a screw-thread profile. Each of the ports is the same and consequently the detail of only one of the ports is shown in the drawing.

Within the smaller diameter section of the port 18 is located a cylindrical pad 22 of PTFE or similar plastics material having a fluid passage or bore 24 formed through the central region thereof which allows fluid from a tube 26 encased within a metal sheath 28 to pass from the tube through the fitting securing the tube in the port (to be described in more detail in relation to FIG. 4) and from thence through the bore 24 to the block 10.

The latter includes drillings which are denoted in dotted outline at 30 and 32 and by axially moving the block 10 within the bore 12 so a drilling such as 30 communicating between two adjoining flat faces of the block 10 can be aligned with the fluid passage bore 24 in the pad 22 and with the corresponding fluid passage in a corresponding pad 34 extending from the adjoining port generally designated 36.

As shown at 38 a further pipe communicates with the port generally designated 36 and with the drilling 30 aligned with the ports 18 and 36, fluid can pass from the pipeline 26 to the pipeline 38 or vice versa depending on the direction of flow.

The other ports generally designated by reference numerals 40 and 42 with their communicating pipes 44 and 46 respectively can be joined by the alignment of the drilling 32 with these ports and depending on the relative positions of the ports 30 and 32 the two pairs of pipelines can be interconnected either simultaneously or alternately by sliding the block 10 from one position to another.

It will be appreciated that the invention is not limited to any particular number of ports or particular drillings or any number of drillings and any number of ports and drillings can be incorporated so as to produce any particular desired program of input/output relationships depending on the axial positioning of the sliding block 10.

Figure 2:
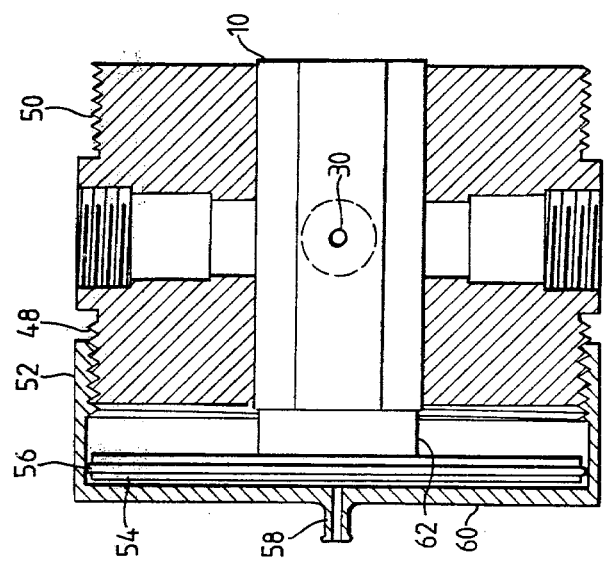

FIG. 2 illustrates one method of obtaining axial movement of the block 10. In FIG. 2 which is a cross-section on the line II—II in FIG. 1 the block is shown in position but the pipes and pipe connections in the ports have been omitted for clarity.

The exterior of the body 16 is formed with external screw-thread profile at 48 and 50 and an internally threaded end cap 52 is screwed onto the thread profile 48. Within the cap 52 is located a piston 54 which sealingly engages the inside of the end cap 52 and typically an O-ring seal 56 is provided.

A fluid connection at 58 allows air or any other fluid under pressure to be introduced into the space between the end wall 60 of the end cap 52 and the piston 54 to push the piston towards the right in FIG. 2.

The piston includes a reduced diameter central abutment 62 the diameter of which is less than the diameter of the bore 14 within which the sliding block 10 is located and the abutment 62 contacts the left-hand end of the block 10 when the end cap 52 is in position so that on the introduction of air or fluid under pressure through the connection 58 the piston 54 is moved forward and in doing so pushes the block 10 to the right as shown in FIG. 2.

Although not shown a spring may be located against the right-hand end of the block 10 to return the block to the left or an actuator similar to that shown at the left-hand end of the valve assembly in FIG. 2 may be fitted to the right-hand end of the valve body and screwed onto the screw-thread profile 50 to move the block 10 to the left.

Figure 3:
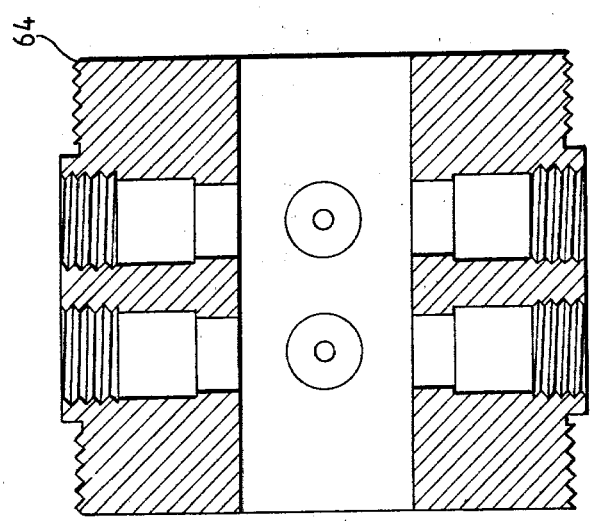

FIG. 3 illustrates a development of the invention in which four pairs of pipes can be fitted to a single valve body generally designated 64. This is achieved by providing appropriate drillings and ports in the valve body 64 and an appropriate number of additional drillings and fluid passages in the sliding block 10 (not shown in FIG. 3).

Figure 4:
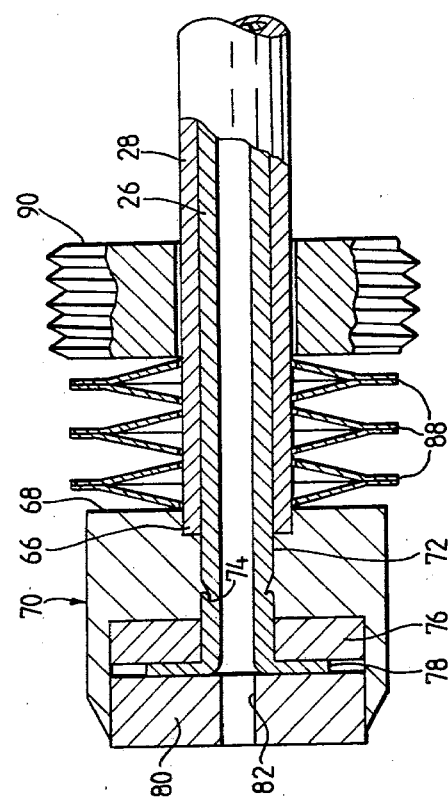

FIG. 4 illustrates to a larger scale the detail of the end fixing for a pipe into one of the pipe connections in the valve body and represents the detail missing from FIG. 1.

A tube 26 of PTFE is encased within a metal tube 28 which is let into an annular recess 66 formed in the plain end face 68 of a metal cup 70. The base of the cup forming the end face 68 is provided with a central throughbore 72 through which the plastics tube 26 can be pushed and includes at least one inwardly directed barb-like projection 74 which bites into the wall of the tube 26 and prevents the latter from being retracted rearwardly through the passage 72 (i.e. to the right in FIG. 4).

The plastics tube which is preferably PTFE is tapered for example by shaving so that it can be pushed through the bore 72 so as to protrude beyond the PTFE back washer 76 located within the cup 70. After being trimmed the end of the tube 26 is splayed out to form an annular flange 78 which is then trapped between the back washer 76 and washer 80 having a central throughbore of diameter equal to the internal diameter of the tube 26 and designated by reference numeral 82.

At the rear of the metal cup 70 is located a compression spring which as shown in FIG. 4 is formed from three pairs of bevelled steel washers known as Belville washers generally designated by reference numeral 88. The washers are threaded on the metal tube 28 surrounding the plastics tube 26 and thrust on the washers is obtained by threading an annular grub screw 90 onto the tube 28 and screwing the grub screw into the internally threaded larger diameter section 20 of the port 18 shown in FIG. 1. Turning the annular grub screw 90 so as to move it generally to the left in FIG. 1 causes the Belville washers to be compressed and the loading on the end face of the washer 84 to be increased. This washer abuts against the rear of the PTFE pad 22 (see FIG. 1) which in turn transmits the thrust to the junction of the inner end face of the pad 22 which abuts the flat side wall of the block 10. The pressure which can be contained by the abutting seal between the pad 22 and block 10 can therefore be increased by employing washers of greater tensile strength which will therefore exert a higher thrust force between the screwed-in annular grub screw 90 and the flat side wall of the block 10.

The particular pipe connection shown in FIG. 4 is one embodiment of the invention described and claimed in a co-pending Patent Application entitled "Improvements in and relating to pipe connections" and the present invention is not limited to this particular preferred form of fixing but is intended to include any convenient termination for a pipe such as 26 in a cup assembly of the type shown at 70.

To this end it is to be understood that the provision of the outurned flange 78 is not necessary and if desired, the flange can be dispensed with by cutting off the protruding pipe 26 flush with the left-hand end face of the PTFE back washer 76 since the abutting right-hand end face of the intermediate washer 80 will form an abutting seal with the squared end face of the tube 26. The latter will be wholly contained between the washers 76 and 80 and consequently there is no fundamental need for the flange 78.

As described in the co-pending Application previously referred to, the tube 26 may be contained wholly within the metal sheathing tube 28 and as a result higher pressures employed in the PTFE tubing than is the case if the tubing is not so sheathed.

It is also to be understood that the invention is not limited to the use of a pneumatic or hydraulically operated plunger or ram as shown in FIG. 2 and that a solenoid or manually operated mechanism may be provided to effect the axial movement of the block 10 within the body of the valve.

Referring again to FIG. 2, it will be seen that the right-hand end of the body carrying the external thread profile 50 may be joined to a similar valve body member (not shown) by using an appropriately internally screw-threaded sleeve which is screwed onto the external profile 50 leaving a protruding internally threaded cylinder similar to the profile of the end cap 52 into which the thread profile 48 of the left-hand end of a similar valve body can be screwed.

Any number of such valve units can be mounted side by side in series and by arranging that the axial length of the blocks 10 just match the spacing between centers of the joining valve assemblies, so thrust exerted at one end of the overall assembly on the block at that end will be transmitted through all the abutting blocks so that all will move in unison.

Where axial alignment of the bores is important (as is often the case) adjustment to the relative positions of the ports in the valve bodies and the drillings in the blocks 10 can be effected by relatively screwing up or unscrewing the end cap 52 from the screw-thread profile 48 and by appropriate screwing and unscrewing of the adjoining body members in the joining sleeves (not shown). In addition spacer members may be located between the adjoining blocks 10 so as to take up lost motion or to re-locate one block relative to another so as to obtain better alignment of drillings and ports.

I claim:
1. A slider valve comprising:
   (1) a body,
   (2) a bore of generally circular cross-section through the body,
   (3) a block slidable in the bore, the cross-section of the block being generally square but with the corners rounded so as to conform to the radius of the bore and allow the block to just fit within the core,
   (4) at least one pair of diametrically opposed ports formed in the body so as to extend perpendicularly to the axis of the bore,
   (5) pipe connections in the body communicating with the said ports,
   (6) pads of resiliently deformable plastics material slidable in the ports and having flat inner end faces adapted to abut and sealingly engage the flat side faces of the block,
   (7) a fluid passage through each pad,
   (8) at least one fluid passage through the block which upon appropriate axial movement of the block within the body can be aligned with fluid passages through two of the pads, and
   (9) means for exerting thrust on the outer end faces of the pads to effect sealing engagement with the block faces, the size of the cross-section of the pads being such that substantially the whole of the external surface of the block is supported by a bounding surface formed on the one hand by the inner wall of the bore and on the other hand by the inner end faces of the pads, thereby to reduce the possibility of distortion and material flow when the thrust on the pads acting on opposite side faces of the block is increased to accommodate high fluid pressures and maintain the sealing engagement between the abutting faces of the pads and the block.

2. A slider valve as set forth in claim 1 in which the pads are formed from polytetrafluroethylene.

3. A slider valve as set forth in claim 1 in which one end of the body is adapted to be secured to an actuator for effecting axial movement of the sliding block within the body between at least two positions.

4. A slider valve as set forth in claim 3 in which the actuator comprises a pneumatic piston and cylinder arrangement with the piston and a central thrust pad attached to the piston abuts one end of the sliding block within the body.

5. A slider valve as set forth in claim 1 in which the body is generally cylindrical and the bore containing the slidable block is coaxial with the exterior of the body, the ends of the body being formed with external screw-thread profiles.

6. A slider valve as set forth in claim 5 in which the pneumatic actuator comprises a cylindrical member one end of which is open and the other end of which is generally closed, an internal screw-thread profile being formed in the open end of the actuator for screwing the latter onto the external screw-thread profile at one end of the body and a piston displaceable within the cylindrical member upon the introduction of fluid under pressure into the space between the closed end of the cylindrical housing and the piston.

7. A slider valve as set forth in claim 1 further comprising means for locking said body relative to an adjoining valve body, to maintain an initial adjustment.

8. A slider valve as set forth in claim 1 in which the pipe connections comprise internally threaded ports of larger diameter than the ports containing the pads and coaxial therewith, and the end of each connecting pipe is formed with an annular shoulder and spring means is located between the rear of the shoulder and an externally threaded annular member screwed into the larger diameter port so as to compress the spring means against the rear face of the shoulder, the forward end of the shoulder acting on a rear face of the pad so as to transmit the thrust applied by the spring means through the shoulder to the pad, the open end of the pipe communicating with a fluid passage through the block in one position of the block.

* * * * *